United States Patent [19]

Jonsson

[11] Patent Number: 5,414,752

[45] Date of Patent: May 9, 1995

[54] METHOD FOR ACHIEVING COMMUNICATION BETWEEN A PLURALITY OF PARTICIPANTS

[75] Inventor: Björn E. R. Jonsson, Järfälla, Sweden

[73] Assignee: Telefonaktiebolaget L M Ericsson, Stockholm, Sweden

[21] Appl. No.: 18,197

[22] Filed: Feb. 16, 1993

[30] Foreign Application Priority Data

Feb. 17, 1992 [SE] Sweden .................. 9200470

[51] Int. Cl.⁶ .......................................... H04M 11/00
[52] U.S. Cl. ...................................... 379/58; 379/265
[58] Field of Search ................ 379/58, 59, 60, 63, 379/265, 266, 95; 455/33.1; 364/400, 401

[56] References Cited

U.S. PATENT DOCUMENTS

| | | | |
|---|---|---|---|
| 4,172,969 | 10/1979 | Levine et al. | 379/70 |
| 4,763,191 | 8/1988 | Gordon et al. | 358/86 |
| 4,899,375 | 2/1990 | Bauer et al. | 379/264 |
| 4,910,766 | 3/1990 | Ogino et al. | 379/201 |
| 4,933,966 | 6/1990 | Hird et al. | 379/132 |
| 4,975,945 | 12/1990 | Carbullido | 379/265 |
| 5,090,051 | 2/1992 | Muppidi et al. | 379/63 |

FOREIGN PATENT DOCUMENTS

| | | |
|---|---|---|
| 0140351 | 5/1985 | European Pat. Off. . |
| 0435449 | 7/1991 | European Pat. Off. . |
| WO89/10044 | 10/1989 | WIPO . |
| WO92/01350 | 1/1992 | WIPO . |

Primary Examiner—Curtis Kuntz
Assistant Examiner—Michael B. Chernoff
Attorney, Agent, or Firm—Burns, Doane, Swecker & Mathis

[57] ABSTRACT

A method and a system is disclosed for achieving communication between a customer of a service which can be supplied over a telecommunication network and a supplier of the service. A service order from the customer passes to a service order central where it is parked and allotted an order identity which is transferred through a signal connection together with the order. The service supplier can, himself, configure the method in which the service shall be delivered and the service supplier himself takes the initiative of creating a communication connection with the service order central and therewith refers to the order identity. When the communication connection has been established, the connection is coupled by the service order central with the parked call from the customer and delivery of the service can commence. A method which utilizes the service of subsidiary suppliers is also possible.

15 Claims, 8 Drawing Sheets

– – – – Signal routes
———— Connection routes

```
UP(HLR)
INFO ON B
PAGING REF: 12345
BUSY MARKED: Y/N
TASK PROCESS (UP): Adress to entry UP(A)
TASK PROCESS (UP): Adress to entry UP(B)
PARKED: Y/N
```
49

```
UP(A)
PORTNR:
STATUS A: Parked
ASK HLR
REPLY HLR: Page
WAIT FOR IA-NR
RING: IA-NR
```
47

```
UP(B)
PORTNR:
STATUS: Parked
ASK HLR:
REPLY HLR: Call waiting
WAIT FOR IA-NR
RING
```
48

```
MI(AB)
ENTRY(i): UP(A)
ENTRY(j): UP(B)
REF(i): IA(A)
REF(j): IA(B)
```
50

FIG 9

METHOD FOR ACHIEVING COMMUNICATION BETWEEN A PLURALITY OF PARTICIPANTS

TECHNICAL FIELD

The present invention relates generally to the field of communication services that are performed through selected telecommunication networks. The invention relates in particular to a service interaction method. A service interaction method is a method of establishing cooperation between two functionalities via a telecommunication network.

The present invention is related to the following five patent applications, to which the following description refers:

1) "A Method of Establishing a Connection", U.S. patent application Ser. No. 08/018,214;
2) "A Method of Establishing Cooperation with a Functionality", U.S. patent application Ser. No. 08/018,268;
3) "A Method of Supporting Communication", U.S. patent application Ser. No. 08/018,213;
4) "A Paging Method", U.S. patent application Ser. No. 08/018,212; and
5) "A Method of Organizing Communication", U.S. patent application Ser. No. 08/018,223.

These applications are enclosed as an annex to the present description and describe mechanisms which can be used in the method according to the present invention.

TECHNICAL BACKGROUND ART

The term communication services is meant to mean conventional telephony services, telex services, datapack services, datel services, telefax services, videotext services, ISDN-services, mobile telephony services, personal paging services, tele-point-services and general communication between two or more parties. The services recited above are only examples of the services possible and are not intended to limit the scope of the invention.

The term telecommunication network is normally meant to mean the telephone networks, telex networks, circuit connected data networks, picture information transfer networks, private telecommunication networks, radio networks, satellite communication networks and general carriers of the communication services, such as analog transmission, digital transmission, synchronous, multiplex or asynchronous multiplex transmission, ATM, etc., for example. These networks are recited solely by way of example and the invention is not restricted thereto.

The term functionality is meant to mean the ability to perform an operation in a telecommunication network. Examples of functionality include activities and services that can be performed in the telecommunication network. Examples of functionalities include an enquiry to establish a connection path or route between two parties, digit analysis, billing or ticketing. Although not necessary, the functionality may require the availability of dedicated equipment for carrying out the functionality. For instance, if the functionality is to receive tones and to analyze tones, it is necessary to make a tone receiver accessible. Other examples of functionalities include voice-controlled speech information, number translation service, conference calls. Other examples of functionality include the functionalities described in the aforesaid five Swedish patent applications, namely communication in the form of a meeting, personal paging, a method of establishing cooperation with a functionality, meeting connection establishment and communication via intermediaries. Still another example of functionality is the ability of being able to choose from among several alternatives.

The term connection is meant to mean a circuit-coupled connection or a package-coupled connection. The term to establish a connection is meant to mean in the circuit coupled case that a circuit-coupled connection is established between two hardware terminal devices (or equipment) and in the package coupled case it is meant that a package-coupled connection creates relationships between logic channels on node-interconnecting physical links. The term to originate or to terminate a connection, is meant to mean in the circuit-coupled case to connect originating or terminating equipment to a circuit-coupled connection, and in the package-coupled case to create a session between applications in originating and terminating nodes respectively.

The term user is meant to mean in the following a human user or a computer-based application which utilizes communication services. The application may be achieved with hardware, software and combinations thereof. The word "part" is synonymous to the term user.

The term terminal is meant to mean equipment which is connected to a telecommunication network and which makes the telecommunication services of the network available to a user.

The term port either refers to an access port or to a transit port. An access port is a location where a dedicated terminal is connected to a telecommunication network. An access port is associated with a destination address which goes to an end user. In the case of a standard telephone network, the access ports are located in a telephone station. In the case of the ISDN-network and the mobile telephone network, the access ports are found in a terminal. A transit port is a port in a connection between nodes. A transit port is not associated with any particular destination address, and can be used to establish any selected connection with a final destination. The final destination is given by the destination address. A transit port can transfer a call to another node or can receive a call from another node.

The final destination of a call is a terminal which is identified by a destination identity. The terminal can be present in the same node as a transit port or in some other node to which the call shall be further connected.

One fundamental feature of present-day communication services is that when a party, hereinafter called A, wishes to communicate with another party, hereinafter called B, A sends a call to B, whereupon a connection is established between A and B. The call and the establishment of a connection route is a coupled sequence. By this is meant that the information which A uses in the call, namely information relating to the identification of B's access point in the telecommunication network, causes a connection route, or path, to be established between the parties. This connection can either be circuit-coupled or, in the case of noncontinuous transmission methods, a so-called virtual connection, e.g. a package-coupled network, ATM-network (asynchronous transfer mode), etc. Traditionally, a connection is established by establishing a route from an origin to a destination. The connection route through the telecommunication network is controlled by fixed, so-called routing tables which are drawn up when configuring or reconfiguring the network. The routing tables may sometimes permit alternative selections, based on local accessibility information.

The traditional communication network is encumbered with many drawbacks. A first problem concerns handling of the resources of the communication network. Firstly, the communication network is, in itself, a resource which is utilized uneconomically in the traditional method of providing communication services. For example, when party A calls party B, so as to establish a connection through the network from A to B, and party B does not accept the call, the network resources have been used unnecessarily. The same applies when party B is engaged. The case is dependent on the predominant use of present-day networks of channel-associated signalling. This involves establishing a signalling connection, which is then used for speech purposes. With common channel-signalling, which is used primarily in the long-distance network, the signal connection is established with the aid of the data package, or packet, whereas the speech connection, the expensive part of the communication, is not established until B answers. Common channel-signalling is scarcely used in local networks. Secondly, the majority of all established connections do not require party B to act immediately on the information that A will transfer.

In the aforesaid cases, the network resources are either used unnecessarily or are utilized in real time, although it would be possible to utilize the resources at a later time.

Present-day telecommunication networks are constructed on the principle that only a limited number of all potential communication possibilities will be utilized simultaneously by users of the network. The telecommunication network is given an internal architecture so configured that common network resources are able to serve a limited number of users which avail themselves of said resources at one and the same time. Consequently, when a large number of users wish to use the resources simultaneously, the resources are insufficient and a congestion is established. The risk of a congestion being created is reduced by increasing the common resources. However, it is often expensive to increase the common resources. Consequently, an advantage is afforded when the desired communication can be redirected geographically or placed later in time, so that the communication can be effected in a manner which smoothens the traffic and reduces the risk of a congestion, without disadvantage to the users.

Another drawback with the known telecommunication networks is that when party A wishes to communicate with party B, it is necessary for party A to direct the call to the network, since the network must be activated in order to establish the connection with party B. In turn, this requires the network to have knowledge of the access port of party B in the telecommunication network. Furthermore, it is necessary for the telecommunication network to select the connection route between party A and party B. This is achieved with the aid of fixed routing tables. Fixed routing tables, however, are a disadvantage, for instance in the case when a large number of users located within a restricted, local geographic area are called through the telecommunication network at one and the same time, resulting in congestion on certain trunk lines leading to the local area. On such occasions, the node will normally have several unused trunk lines from other geographic areas. The routing tables, however, do not permit these unused trunk lines to be used temporarily for the purpose of relieving the traffic to the local area. By way of example temporary geographic traffic concentrations can be caused by large sporting events of a temporary character, among others.

When seen from the aspect of party B, present-day telecommunication networks are also rigid in structure and slow in redirecting the call to B when B moves from its access port in the telecommunication network. In present-day telephone networks, this problem is solved by service such as "temporary transfer" (diversion) or "redirection". However, if it is necessary for party B to change its access identity permanently, the problem will remain, i.e. that the party who wishes to reach party B must have knowledge of the new access identity. The mobile telephony solves this problem, but at the price of requiring the network to continuously register where B (or B's terminal) can be reached.

SUMMARY OF THE DISCLOSURE

The inventor of the present invention has discovered that many of the aforesaid drawbacks can be avoided with a novel type of communication, in which the node X of party A communicates with the node Y of party B indirectly through an intermediary M. In present-day conventional techniques, a connection is established by coupling A through the network all the way to party B. By splitting the traditional sequence "call-establishing route from an origin to a destination", in accordance with the invention, a connection can now, instead, be considered as the establishment of a route between two equal parties, wherein one route can be established from A to B, or from B to A, or from A to an intermediate meeting point M(A) and from B to an intermediate meeting point M(B), whereafter M(A) can be connected to M(B). The intermediate meeting points M(A) and M(B) are connected to a telecommunication network which both parties can reach. Splitting of the connection sequence also means that a call can be considered as a service order.

Traditionally, a call is considered as an order for the establishment of a connection route from an origin to a destination. In accordance with the novel inventive method, the dialling of a number on a telephone apparatus means, instead, that party A has ordered a service, in this case a communication service.

The communication service, according to the basic concept on which the invention is based, is divided into a separate negotiating phase and a connection-establishing phase. The connection-establishing phase is not initiated until both of the parties concerned have accepted that communication shall take place and when the access points of the parties have been announced. The term separate is meant to mean here that the aforesaid coupled sequence between call and the establishment of a connecting route has been broken both in time and in space. Interruption of the coupled sequence in time means that the negotiating phase of a communication service is separated from the establishment of a connection route or path. A connection route is not established until a time at which both parties agree that the communication phase of the connection shall take place. In this way, the time at which a connection path is established will be delayed in relation to the time at which the call was initiated, although the invention does not exclude the establishment of a connection path at the time of making the call, provided that certain conditions are fulfilled.

The connection route, or path, between the parties need not necessarily be established in the same telecommunication network as that in which the negotiating phase or phases takes or take place. However, the invention does not exclude the use of the telecommunication network over which the call/calls takes/take place for communication between the parties concerned.

One characteristic feature of the inventive concept fundamental to all of the aforesaid copending patent applications is that a first party manifests its desire to establish communication with a second party, by making a call to a third party which is designated either meeting mediator, meeting arranger, connection receiver, service order central or searching center, registers the call, assigns identification to the call and negotiates with or has already negotiated with the first and the second parties with regard to the conditions under which a connection shall be established between the parties.

One drawback with present-day telecommunication networks is that when a service or functionality is initiated, it is necessary for the person desiring access to the service, called the user or party A, to call the access port that is associated with the service or the functionality which the user desires. It is necessary for the telecommunication network to include intelligence for establishing that the called access port is not associated with a subscriber but is a service or a functionality. The telecommunication network intelligence shall then decide from which access port the desired service or functionality shall be delivered. Furthermore, the network shall connect the user to the called access port where the supplier of the service is found. The network must contain information which is related to each supplier of services or functionalities present in the network. Furthermore, it is necessary for the network operator to keep an account of and to update all information that is concerned with the manner in which each individual supplier wishes to deliver its functionality. In other words, it is necessary for the network operator to keep in order large quantities of information. It is necessary to contact the network operator each time an individual supplier wishes to change the method in which the functionality is delivered, which makes handling of functionalities and changes of functionalities slow, sluggish and inflexible. As an example of a traditional technique, it can be mentioned that a present-day company may have a telephone number, in Sweden a so-called 020-number, in the U.S.A. a so-called 800-number, which is common to all of the district offices owned by the company. A number-translating service is connected with the company's 020-number. The number-translating service means that a client who calls the company's 020-number will be connected to the district office which serves the routing number area from which the client calls. The system functions satisfactorily until the day that the district office wishes to close temporarily, for instance because of vacation or holidays. In this case, it is necessary for the district office to contact the network operator and ask for all incoming calls to be redirected to another of the company's offices during the vacation period. This request for call redirection must be given to the network operator in good time, and the network operator must then reprogram all of the telephone exchanges concerned. Such reprogramming takes time. It will be seen from this example that present-day systems are slow and that the structure is inflexible. It would be far easier if the district office who intends to close for the vacation period was able to redirect incoming calls itself, i.e., was able to choose how the number-translating service could be configured, since it would then be unnecessary to contact the network operator when the change shall be made.

When a district office finds that the calling user requests a service which the district office is unable to deliver but which can be delivered either by a completely different supplier which does not belong to the company (called switching of suppliers), or by another district office (called subsidiary supplier method), the call is not normally transferred when using traditional techniques. Instead, it is necessary for the user to call the new supplier or subsidiary supplier, because the connection already established cannot be changed when using the traditional technique.

When applying the inventive concept for intelligent network services for instance, in which a first party, party A, orders through a telecommunication network a service from a service supplier known to party A and supplying the service over a telecommunication network, the service order is freed from being coupled to the establishment of a connection route to the service supplier. The service order passes to a named third party, called service order central, which registers the service order and allots a reference thereto, which is later transferred to a service supplier picked by the service order central or by a service supplier selector. According to the present invention, the service supplier establishes connection with the user, by using the aforesaid reference. The advantage with this method is that it is possible for the service supplier itself to configure the method in which he will supply his service.

The service supplier himself can own the equipment used for supplying the service and the equipment need not accompany the signalling protocol of the network operator for access to the fundamental communication service, i.e. standardized network protocol for coupling connections. No protocol is required in the network for advanced services.

The method in which the service supplier establishes a connection with the user is described in U.S. patent application Ser. No. 08/018,214. This latter patent application describes a method of establishing a connection in the form of a meeting. The parties wishing to be connected to one another call a common meeting point, each from his or her particular location, at which the connections incoming from the parties are mutually joined. When applying the present invention in conjunction with intelligent network services, application of the aforesaid connection mechanism described in the patent specification provides two advantages; firstly, that it is possible to switch from service supplier to service supplier without the person ordering the service, i.e., the user, needing to break his/her connection with the service supply central; and, secondly, that the service ordering center is able to transfer the customer connection to another node in the network, namely to the meeting point, which from a geographical aspect and/or a traffic load aspect is suitable as a meeting point for both the customer and the supplier.

Another problem which is solved highly satisfactorily by using the aforedescribed principle of separating the call from an established route between the parties, is that the conflicting situations which occur when several users in the network wish to use one and the same functionality but that the functionality is unable to satisfy all users at one and the same time is solved in a simple manner. For example, a situation of this kind may arise in telephone conference equipment which forms a common network resource. According to the present invention, the service supplier shall send a connection order to the node in which the meeting shall take place. If the service supplier delivers services simultaneously to several different users, wherein each user obtains a respective identification, the service supplier is able to ensure that he distributes solely the number of identifications permitted by his resources. When the resources are empty, the supplier will inform the service order central or the service distributor that his resources are exhausted and that resources must be sought in some other location in the network. This avoids establishing connections which would become congested. Other examples of common resources include speech information equipment, a voice postbox, a so-called interworking unit, etc.

With present-day telephone networks, problems occur when several thousands of subscribers generate simultaneously a call on a service in a node X and the service is only able to serve a given number of calls each second. This results in an imbalance in the telephone network and local users in node X are also afflicted by congestion or by an impaired service, since calls waiting for the service seize the majority of the trunks between node X and the network. When practicing the present invention, these calls waiting on the trunk lines are eliminated, because waiting takes place in the service order centrals. Situations of the aforesaid kind occur when, for instance, a television company asks viewers to call a certain number. At present, this problem is solved by the television company concerned with informing the network operator at an early date that viewers will call a certain number on a certain day and at a certain time, and the network operator then has time to reorganize the telephone station in node X, so that certain paths or routes are reserved for outgoing calls. If the television company concerned neglects to inform the network operator that an event of this kind will take place, the telephone station in node X will be knocked out and other telephone stations close to the telephone station in node X will experience congestion.

One object of the present invention is to utilize existing networks and the resources of existing networks more effectively than has been achieved hitherto, by separating a call from the establishment of a connection route.

Another object of the invention is to provide a communication method in which the supplier himself determines the manner in which the service ordered shall be supplied. A further object of the invention is to provide a communication method which will enable switching between service suppliers while maintaining connection with the user.

Still another object of the invention is to provide a communication method with which the supplier of a service can delegate the supply of parts of the desired service to a subsidiary supplier.

Yet another object of the invention is to provide a communication method with which the connection between user and service supplier can be established in the form of a meeting.

The invention also relates to the provision of a communication method which will enable selection of the node in which the meeting shall take place.

Still another object of the invention is to provide a communication method which will prevent the occurrence of congestion for local subscribers in a node in which mass calls are made.

These objects are achieved with a method having the characteristic features set forth in the accompanying claims.

The present invention will now be described in more detail with reference to different exemplifying embodiments thereof and also with reference to the accompanying drawings, in which FIG. 1 illustrates different nodes which are used when practicing the inventive communication method;

FIG. 9 illustrates different data records created by assignment or task processes which are initiated in conjunction with practicing the communication method according to FIG. 7.

DETAILED DESCRIPTION OF THE DISCLOSURE

Figure 1:
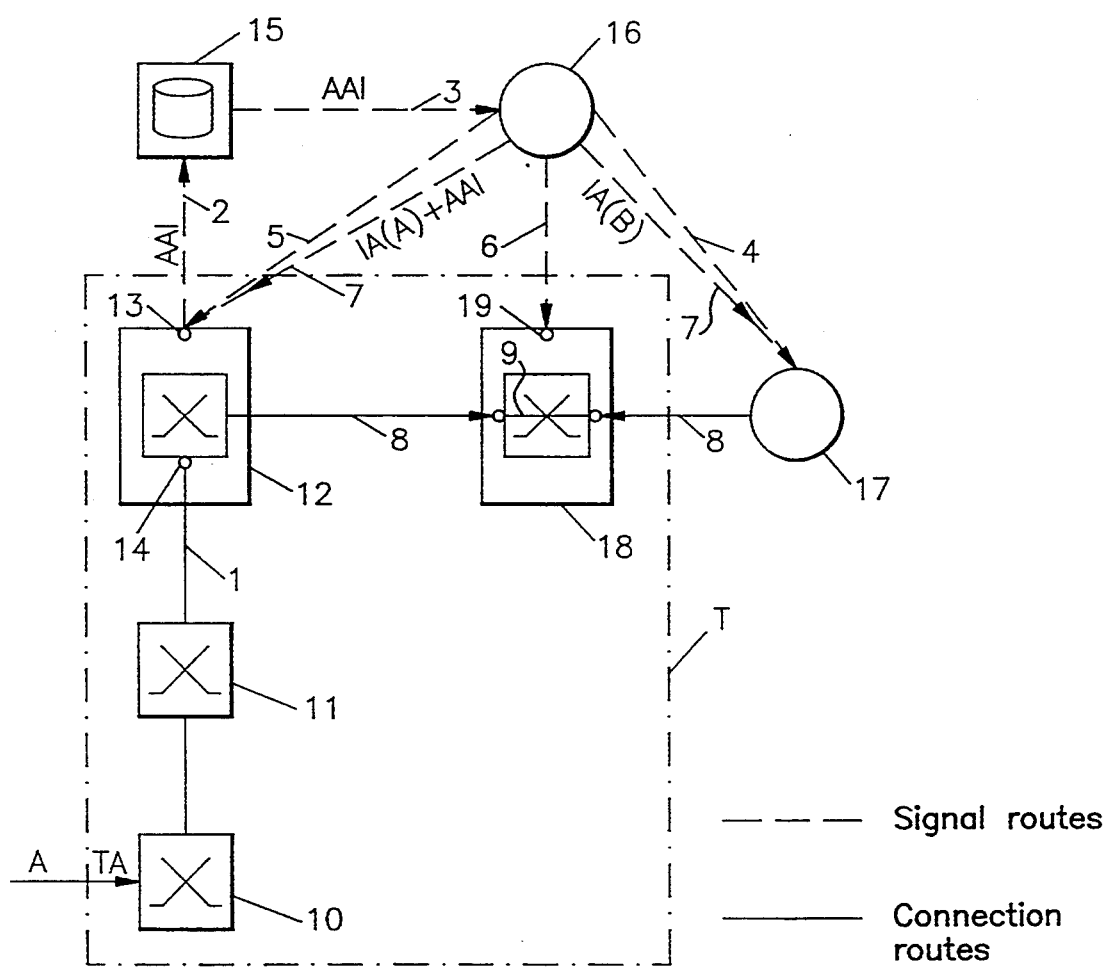

FIG. 1 illustrates a user A who wishes to order a communication service and to this end makes a call which contains a destination identification, e.g., a directory number, which corresponds to the service desired by the user. The destination identification is called hereinafter service access number and is abbreviated to TA-number. User A may be a person, a computer or a functionality and is sometimes also referred to below as a service customer.

The telecommunication network T, defined in broken lines in FIG. 1, through which the TA-number is sent, includes various types of coupling nodes which have different functionalities, among others a first node 10 which does not recognize the TA-number but transfers the number to another node 11 which has a functionality that recognizes the TA-number and notices that the call is concerned with an order for a service and that the call shall therefore be sent to a service order central 12. When the call arrives at the service order central 12, there is commenced an assignment or task process schematically illustrated at reference numeral 13. The assignment process 13 is realized in the form of a program which runs simultaneously with other programs which control other conventional processes of the service order central 12, such as coupling, billing, traffic monitoring, etc. The assignment process notes the port on which the call from A arrived. This port is marked symbolically with reference numeral 14 in FIG. 1. The assignment process parks the connection 1 on which the call arrived and creates a relationship with A's call, by generating a data record, hereinafter referred to as user access individual AAI. Thus, the user access individual constitutes a reference to the call made by A. A user access individual is created for each call that arrives at the service order central 12.

On the basis of the TA-number, the service order central 12 sorts the service orders in accordance with identity and establishes the service which the user wishes to use and also the supplier from which the service shall be delivered. The choice of supplier is effected in response to an enquiry sent by the assignment process 13, via a signal network, to a database 15 in which information concerning available services and service suppliers is stored. This enquiry to the database 15 is sent on a signal network illustrated symbolically with the broken arrow 2 in FIG. 1. The assignment process 13 sends the reference to A's call, i.e., AAI, together with this enquiry. On the basis of the data, or information, stored in the database, the database indicates a supplier of the service ordered and then sends an order, called service order, to the supplier indicated. The reference AAI is sent further from the database to the indicated supplier together with the supply order. This transfer is effected over a signal network illustrated symbolically with the broken arrow 3. The indicated supplier, called service supplier, is referenced 16. The service order is administered by the service supplier 16. The service supplier 16 need not have the functionalities and resources required for supply of the service, such as speech answer equipment, tone decoding equipment, etc., but may in turn order these resources from one or more other nodes which possess the desired resource and functionality respectively. A node having the desired functionality and the desired resource respectively is called a resource node and is referenced 17 in FIG. 1. A dialogue takes place over a signal network between the service supplier 16 and the resource node 17. This dialogue is illustrated symbolically by the broken arrow 4. When the service supplier 16 has booked those resources needed to supply the service, the service supplier 16 sets up a signal path 5 to the service order central 12 and transfers the reference AAI in order to refer to the service order made by A. At this stage, the service supplier 16 has a signal connection with the resource node 17 and the service order central 12. In addition, the resources required to provide the service have been booked. All that now remains is to establish a connection between the resource node 17 and the parked call from A.

In the aforesaid patent application referenced LM 5516, filed at the same time as the present application, there is described a method of establishing connections between two functionalities which are located in different nodes. According to this patent application, the connection is not established in a conventional manner, by one node setting up a connection route to the other, but, instead the connection is established in the form of a meeting at a meeting point which is situated in a node in a telecommunication network. In order for the meeting to be able to take place, the service supplier 16 first selects a meeting point and then sends a connection order to the node in which the meeting is to take place, over a signal network. This node is called a meeting node and is identified by the reference numeral 18. The connection order is identified by the broken arrow 6 and is sent over a signal network. When the connection order is received, an assignment or task process, schematically shown at reference 19, is commenced in the meeting node 18. In response to the connection order, the assignment process 19 reserves two meeting references, so-called interaction numbers or in short IA-numbers which are selected from the number series of the meeting node 18. The IA-numbers are described in more detail in U.S. patent application Ser. No. 08/018,268, filed at the same time as the present application. The two IA-numbers, called IA(A) and IA(B), are sent by the assignment process 19 to the service supplier 16 via the signal network. The broken arrows 7 illustrate transmission of the IA-numbers.

In the next step of the connection establishing process, the service supplier 16 sends one of these IA-numbers, IA(A), to the service order central 12 and the other of said numbers, IA(B), to the resource node 17 via the earlier established signal paths 5 and 4, respectively. The transmission of the IA-numbers is illustrated by the two broken arrows 7, for the sake of clarity. The service supplier 16 sends the reference AAI to the service order central 12 together with the IA-number, IA(A), so that the service order central will know that the transmitted IA-number refers to the service order from the user A. At the same time as the IA-numbers are transmitted, the service supplier 16 instructs the service supplier central 12 to make a call stating the number IA(A) as the destination address. The service supplier 16 also orders the resource node 17 to make a call and use the number IA(B) as the destination address. Both of the nodes 12 and 17 now call with respective destination addresses. Two connection routes are then established to the meeting node 18. These connection routes are marked with the two full-line arrows 8. In conjunction with establishing the connection route 8 from the service order central 12 to the meeting node 18, the assignment process 13 connects the parked connection 1 to the connection route 8 which passes from the service order central 12 to the meeting node 18. When the meeting node 18 finds the existence of incoming calls of which one refers to IA(A) and the other to IA(B), the assignment process 19 will know that these IA-numbers have been assigned for a given purpose, namely that an incoming call which refers to the one IA-number shall be connected to an incoming call which refers to the other IA-number. The meeting node 18 then connects the two calls, as shown schematically by the full line 9. The connection between A and the resource 17 is now established and the resource node 17 can begin to supply the service.

When the service has been supplied, the connections 1, 8 are broken and all created data records are cancelled.

Figure 7:
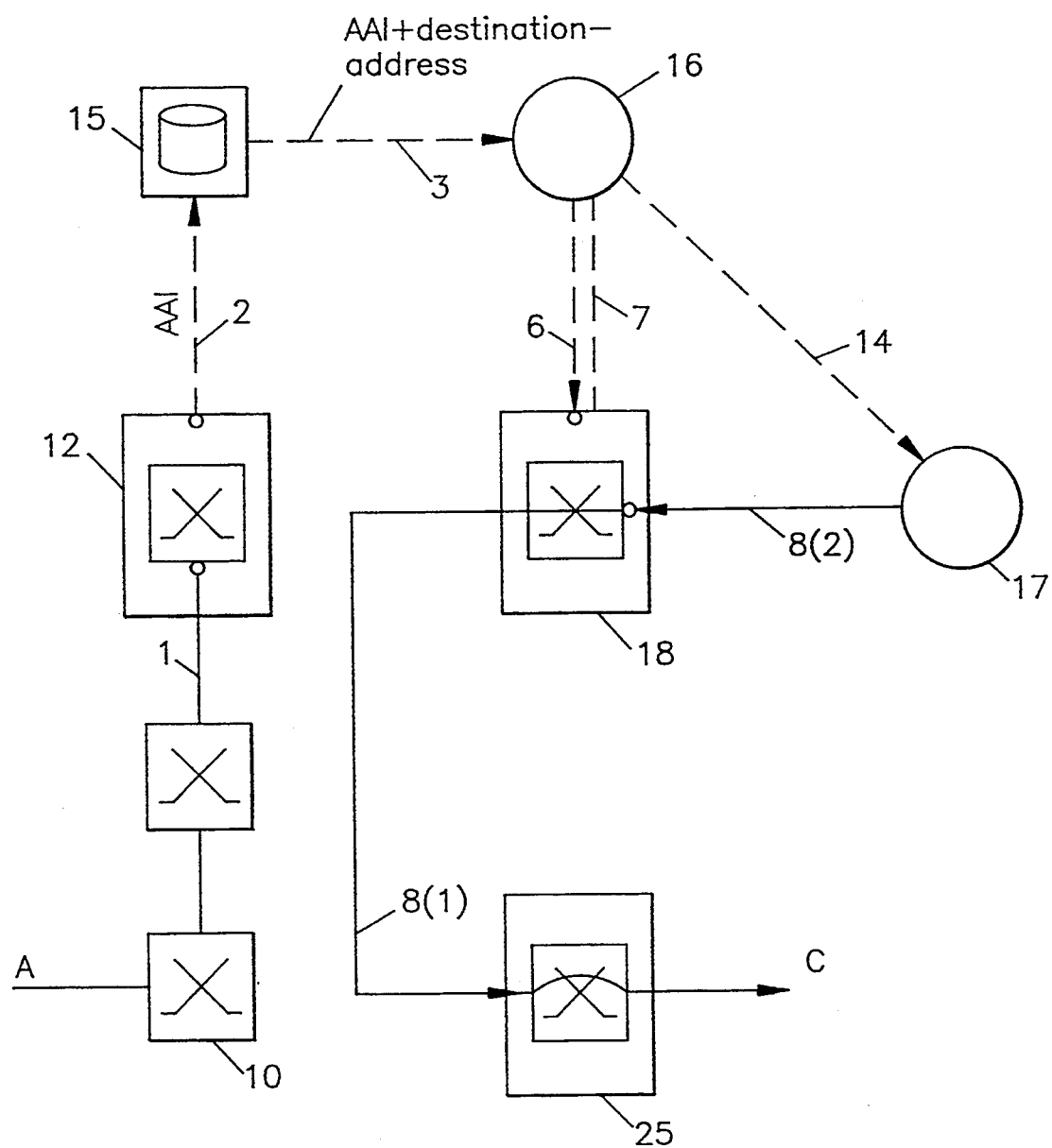
FIG. 7 illustrates an example of a traffic situation in which the inventive method permits cooperation between four different participants.
Figure 8:
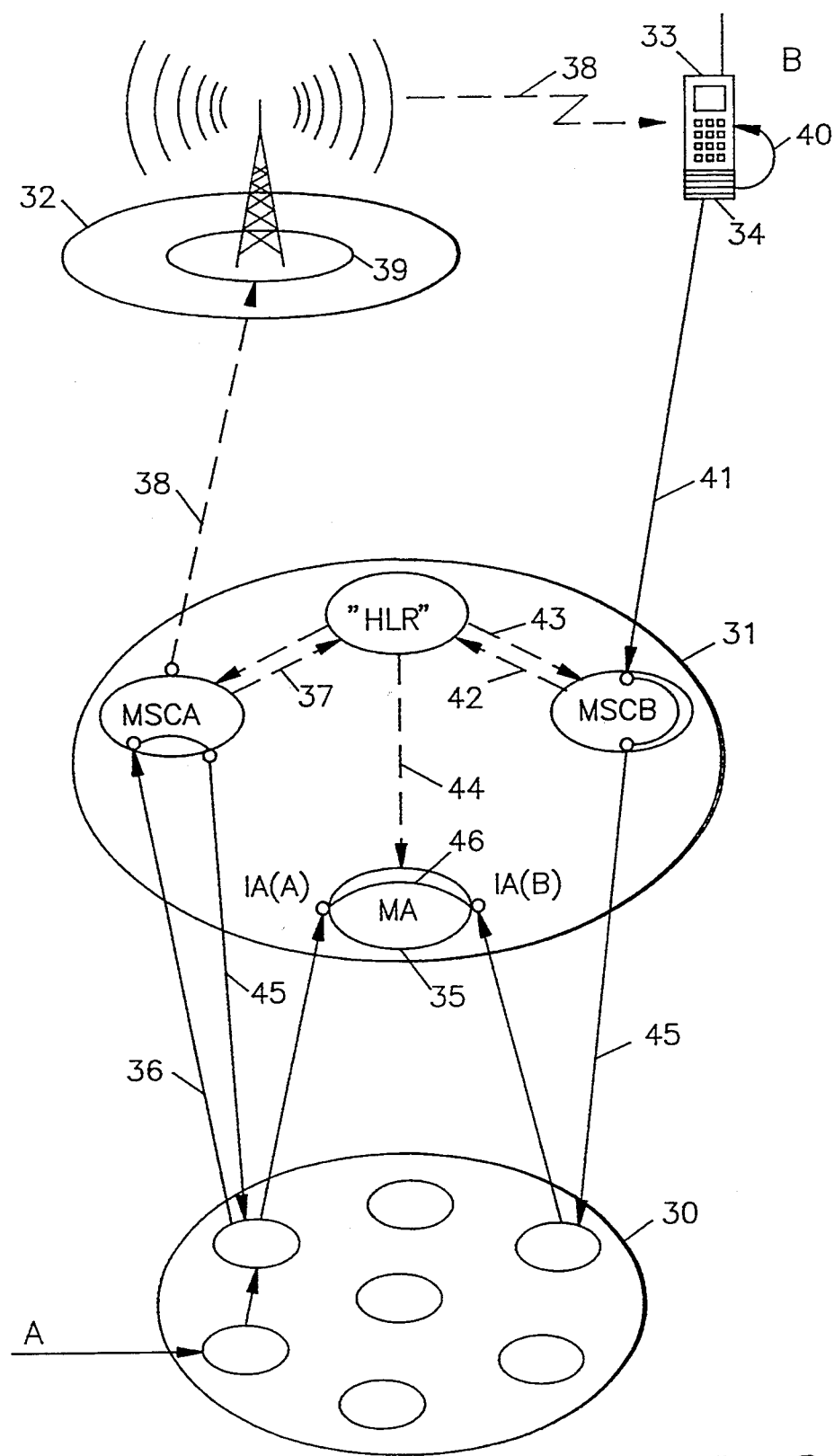
FIG. 8 illustrates an example of an inventive communication method adapted to mobile telephony.

Although not described in detail above, an assignment or task process is started both by the service supplier 16 and in the resource node 17 in conjunction with an incoming service order and a resource booking, respectively. These assignment processes initiate data records similar to those described above with reference to the assignment process 13 and 19, respectively. Examples of the configuration of such data records is described in conjunction with the example illustrated in FIG. 7 and are also illustrated in FIG. 8. These assignment processes are controlled by controlling operation-and-maintenance processes.

Shown in FIG. 1 with broken arrows are signal routes, or paths, between connection routes for establishing connections over which services are supplied, shown by full-line arrows. The signal connections can be established over any signal network. For example, the signal connection 5 between the service order central 12 and the service supplier 16 is preferably a selected signal network chosen from among those telecommunication networks at the disposal of both the service supplier 16 and the service order central 12.

According to one preferred embodiment of the invention, the service customer A negotiates with the service order central 12 concerning the telecommunication network in which the desired service shall be delivered. This negotiation takes place while the service customer A is connected with the service order central 12. Normally, both the service customer and the service order central have access to several different telecommunication networks, and the service customer A chooses a suitable network over which the service shall be supplied and informs this choice to the service order central 12. For instance, this will enable the service customer to place the order by telephone and ask for the service to be supplied over, for instance, a data network which, for instance, utilizes package coupling.

The order identity AAI produced by the assignment process 13 differs from the aforesaid IA-numbers insomuch that the order identity is used during the signalling sessions occurrent between the nodes, whereas an IA-number is not ordered and chosen until the customer and supplier are agreed that a connection between two functionalities shall be established. The IA-number can be cleared when a connection between these functionalities has been established. Normally, an IA-number exists only during the stage of establishing a connection, e.g. for 20 seconds, whereas a signal reference AAI, on the other hand, exists during the whole of the cooperation time between two functionalities in different nodes. Such cooperation depends on the occurrent functionalities and may exist for a long period of time. For example, when concerning a telephone booking of a flight ticket, the cooperation between customer and supplier can continue for quite some time, and the signal reference AAI will exist during the whole of this period. There are times when it is necessary for an IA-number to exist over a longer period of time, for instance when supplying part service from different resource nodes, in which case the IA-number is not cancelled until the number is no longer needed.

Although the illustration given in FIG. 1 includes only one service ordering central 12, it will be understood that a telecommunication network may include several service ordering centrals 12, and that the service ordering central to which the call from a user is connected is preferably chosen so that the distance between the calling user and the service order central is as short as possible.

The database 15 can be considered to form a service supply mediator. Although only one database 15 is shown in FIG. 1, several databases may be present. For example, one database may be specialized for certain types of service, while another database is specialized for other types of service.

Although FIG. 1 shows only one service supplier 16, it will be understood that several service suppliers may be included and that one service supplier may function to supply only a certain part of the service requested and then transfer the request to a subsidiary supplier for supplying a remaining part of the service requested. Similarly, a subsidiary supplier may, in turn, engage another subsidiary supplier to supply a given part of the service requested.

None of the nodes 10, 11, 12 and 18 need have knowledge of access ports to service suppliers, service subsidiary suppliers, resource nodes or other units which are involved in the service configuration. All that these nodes 10, 11, 12 and 18 need know is to couple connections to stated destinations. These nodes are therefore shown in the form of rectangles and all have a conventional circuit-coupled switch or a package switch, illustrated by a rectangle and crossing lines, for example as illustrated at 10. The nodes 15, 16 and 17, on the other hand, need not be provided with a switch, but may be comprised of computers with associated programs and equipment for signalling over a signalling network.

The service supplier 16 can select a meeting node 18 in many different ways. One suitable method of selecting a meeting node is to place the node 18 as close as possible to the resource node 17, so that the resource node is loaded to the least possible extent by the costs of establishing the connection, since it is the user A who requests the connection. The opposite case may also apply in which the meeting mode is chosen as close as possible to A, because the service supplier takes responsibility for the costs.

Different charging principles can be applied, for example the principle utilizing a 020-number (corresponding in the U.S.A. to the 800-number) as described in the introduction, or the known principle of toll-ticketing.

When applying the 020-number principle, the user dials a 020-number and is then connected to the service supplier 16 at the cost of a local call, irrespective of the connection route. The service supplier has noted agreement with the operator of the network T and is billed by the operator partly for that part which the call costs in addition to the cost of a local call and partly the cost for the service and the time taken to supply the service. The service supplier then bills, in turn, the service customer A for the service performed.

When applying the toll-ticketing principle, call data, such as B-subscriber-number, A-subscriber-number, date, and recording the time at which establishment of the connection was commenced and the time at which the connection was terminated, is recorded for instance on magnetic tape. The recorded data is then used as a basis for billing the call. According to the present invention, this call data is supplemented with data, or information, relating to the IA-number, which enables the network operator and the service supplier 16 to agree as to how a call shall be billed. As before mentioned, the service supplier has full control over where the meeting point shall be located and can therefore determine how far into the network the service customer A can be connected at his own cost to receive the service in the meeting node. The meeting point can be placed, for instance, close to the service customer, wherewith the major part of the call cost is carried by the service supplier, or close to the service supplier, wherewith the major part of the call cost is carried by the service customer A, or the meeting point can be placed somewhere between the service customer A and the service supplier 16, wherewith the call cost is divided in corresponding proportions between the service supplier and the service customer A. The network operator is able to bill the service supplier and the service customer on the basis of the aforesaid recorded call data. The service supplier may also reach agreement with the network operator as to his own discount on the call tariff, or call rate, when the service supplier is a large client of the network operator.

The service supplier 16 may, himself, own all resources, in which case the signalling illustrated by the arrows 4 and 7 is not carried out and the connection 8 is established from the service supplier to the meeting node.

The database 15 need not be located in a separate node, but may be co-localized with the service supply central 12.

Alternatively, the database 15 may be excluded completely and the service supply central 12 provided with knowledge as to who shall supply the service requested. The service supply central 12 can then send the service order direct to the service supplier and the signalling symbolized by the arrows 2, 3 is replaced with a single signalling arrow direct to the service supplier 16.

A program in the resource node 17 constantly keeps track of the number of resources booked. If all resources are booked and an enquiry arrives from a service supplier for the supply of a particular service, the resource node 17 explains in the dialogue marked by the arrow 4 that no resources are available at present. The service supplier 16 can then turn to another resource node (not shown in FIG. 1) with the same booking enquiry.

If, when practicing traditional methods, all service access numbers (TA-numbers) were connected to the resource node 17 from which the service is supplied, and all resources were occupied, congestion would occur. This does not happen when practicing the inventive method, since the connection to the resource node 17 has still not yet been established when the order arrives on the signal network. The service supplier 16 is still able to turn to another supplier of corresponding resources over the signal network. The IA(B)-number is not sent until a resource node has expressed willingness to supply the service.

If the service supplier 16 discovers that not all of the service requested can be delivered from the resource node 17, the service supplier 16 is able to book the remaining resource at another resource node, in order to complete the service. When the resource node 17 has delivered its part of the service, the resource node 17 will clear its connection 8 with the meeting node 18. Prior to this, the resource node signals the service supplier 16 to the meeting node 18 and instructs the node not to clear the connection to the service order central 12. The meeting node 18 is instructed to remain in a waiting state and to await a renewed call which has IA(B) as its destination address. The service supplier 16 then sends the IA-number, IA(B), to the new resource node, which makes a call with this IA-number, IA(B). The meeting node 18 identifies an incoming call, makes a number analysis and discovers that the call number is an IA-number. The meeting node 18 then looks in its number table for the purpose allotted to the IA-number, in this case IA(B), and discovers that the number is associated with IA(A). The meeting node 18 then connects the port on which the call from the new resource node has arrived with the port on which the connection 8 from the service order central 12 still exists. The connection between A and the new resource node is now established. The advantage with this method is that the user A need not mark that the service is supplied from different resource nodes. Neither need the caller renew a call to the node which shall supply the remaining part of the service. In other words, the meeting node 18 is fully transparent from the point of view of the user A. As earlier mentioned, the meeting node 18 need have no knowledge of the service supplied by the service supplier.

It is also possible to refer to a new meeting node when a new resource shall be connected.

Figure 2:
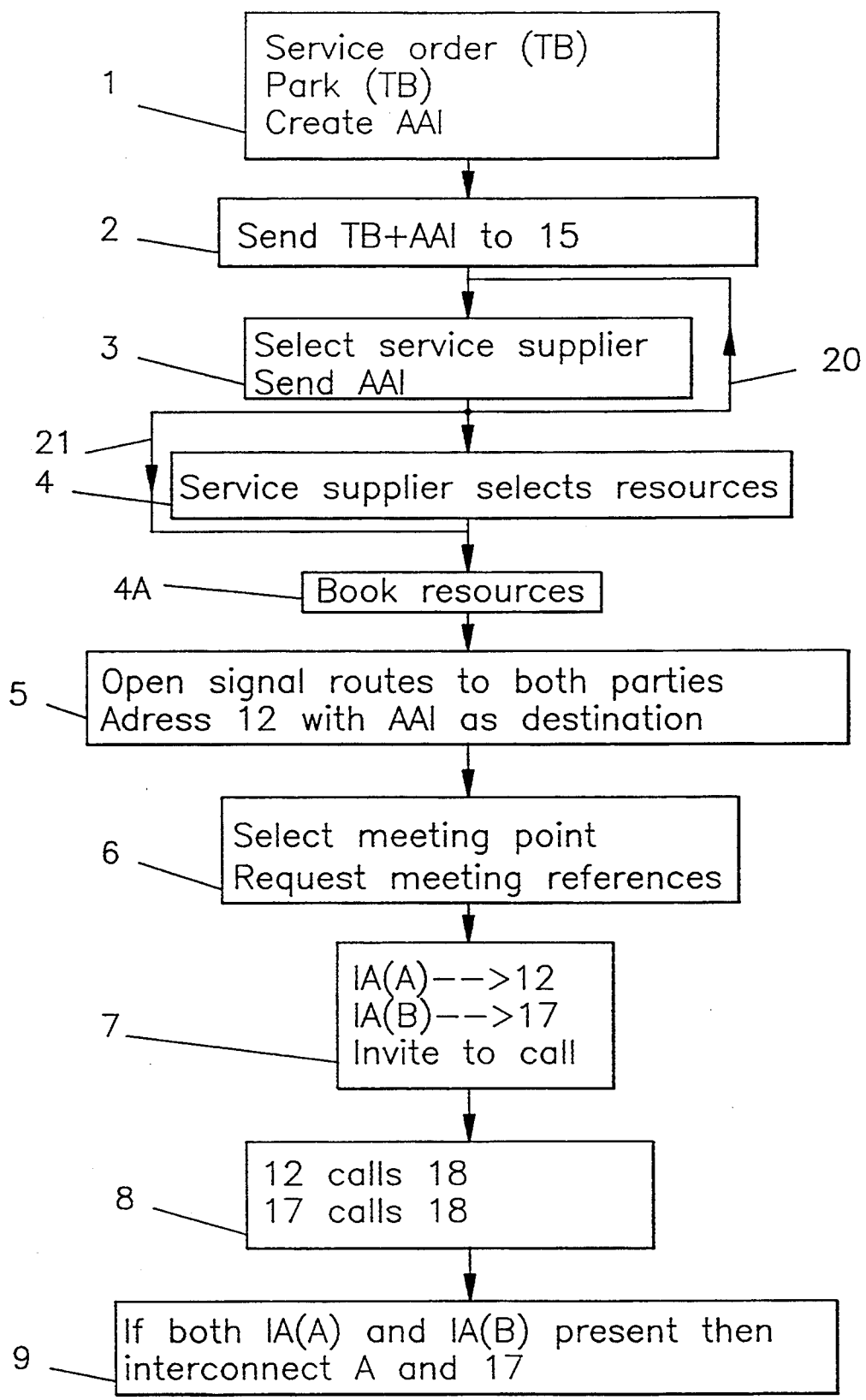
FIG. 2 is a flow sheet illustrating the communication method illustrated in FIG. 1.

FIG. 2 is a flow sheet which illustrates the communication method according to FIG. 1. In FIG. 2, the rectangle 1 refers to the arrow 1 in FIG. 1, the rectangle 2 refers to the arrow 2, etc. When a service order TB arrives at the service order central 12, the call is parked, the port on which the call has arrived is noted and a reference AAI is created by the assignment process 13. A is also preferably marked as engaged. The assignment process then adopts a waiting state and awaits for instructions as to where the incoming call shall be connected further. The service order TB is signalled to a service supply mediator together with the reference AAI, in this case to the database 15. The service supply mediator chooses a service supplier TL and sends the reference AAI to the selected supplier. The supplier TL selected may not be able to deliver the service ordered, in which case the supplier will repeatedly transfer the request, represented by the arrow 20, until a service supplier is found who is willing to supply the service requested. This is represented by rectangle 3. The service supplier selected will then select the resources required for supplying the service requested, rectangle 4. When requisite resources have been chosen, the resources are booked, shown in rectangle 4A. When the service supplier is, himself, able to provide the necessary resources, the stage represented in rectangle 4 is omitted, and the resource or resources is/are booked directly, as shown at arrow 21.

Subsequent to booking the resources, signal routes are opened to both parties, i.e., to the service order central and to the booked resource respectively. In order to enable the service supplier to refer to the correct service order, the service order central is addressed with the reference AAI. These procedures are illustrated in rectangle 5. The service supplier then chooses a meeting point, rectangle 6, and requests meeting references from the node serving as the meeting point. The service supplier receives these meeting references IA(A) and IA(B) and sends one reference, IA(A) to the service order central 12 and the other reference IA(B) to the booked resource 17. At the same time, the service supplier instructs the two parties to make a call with the transmitted meeting references, rectangle 7.

In the next stage of the method, rectangle 8, the service order central calls the meeting node by giving IA(A) as the destination address and the node in which the booked resource is found also calls the meeting node, but now with the destination address IA(B).

The activity on the incoming ports is monitored continuously in the meeting node 18. The meeting node is aware of the purpose for which the meeting references have been allotted. Immediately one party is present at an inlet port and recites one of the two allotted meeting references while, at the same time, another party is present at another port and recites the other meeting reference, the meeting mode functions to connect the two incoming ports together, rectangle 9, thereby establishing the connection between the two parties concerned. Subsequent to having delivered the service requested, the party connection with the meeting node is cleared and all references to the meeting node and to the assignment processes are annulled. It will be understood that these references can then be used for new incoming service orders.

Figure 3:
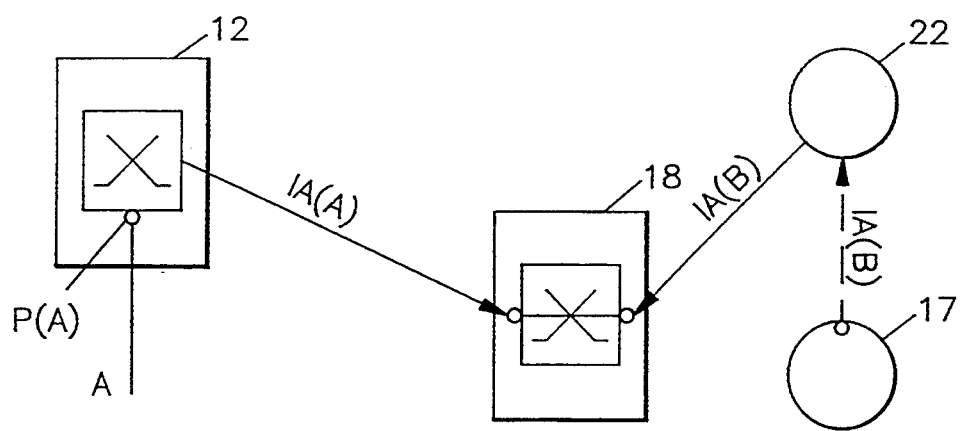
FIG. 3 illustrates the possibility of changing service supplier without needing to disconnect the connection to the user.

FIG. 3 illustrates the aforesaid case in which a resource or a service supplier finds that he is unable to supply the whole of the service requested without assistance from another resource or supplier, wherewith the original resource 17 transfers its meeting reference IA(B) to a new resource, reference 22, from which a call is made to the meeting node 18 while reciting IA(B) as the destination. The meeting node 18 is still transparent to the user A and the service which initially was supplied from the resource node 17 is now supplied from a new resource node 22. Although not shown in FIG. 3, the service supplier coordinates or synchronizes those activities required to transfer the service delivery from the resource node 17 to the resource node 22. This coordination is effected by signalling on a signal network.

Figure 4:
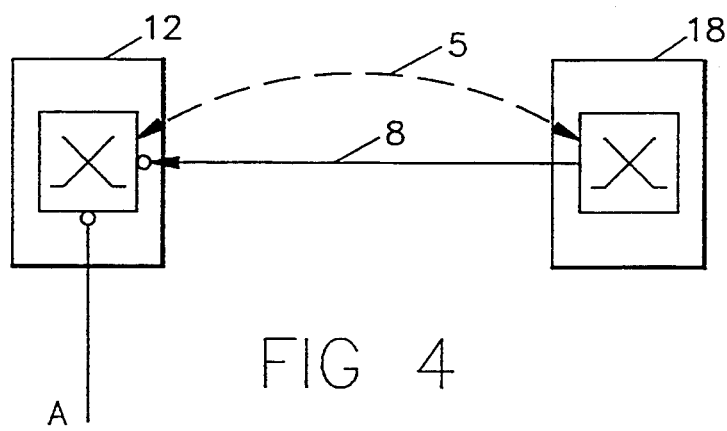
FIG. 4 is a variant of the telecommunication method according to which the meeting point is located at the service supplier.

FIG. 4 illustrates a variant of the inventive communication method, in which the meeting node 18 is placed at the same node in which the service supplier 16 and the resource node 17 are found. In this case, a connection route is established from the service supplier 18 to the service order central 12, as shown by the full arrow 8. The signal route is still marked with the broken arrow 5.

Figure 5:
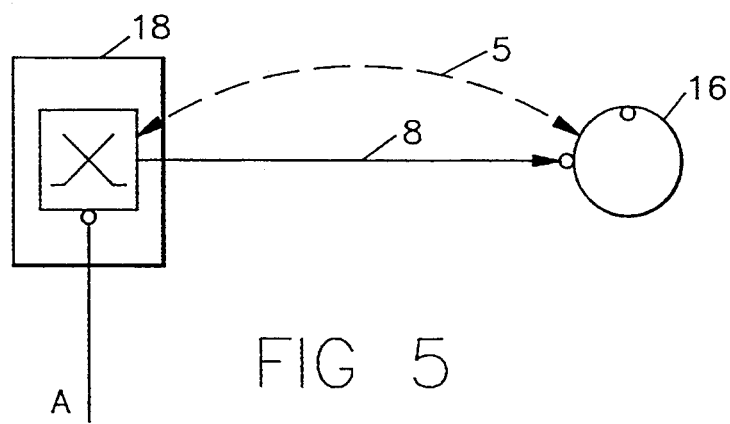
FIG. 5 illustrates another variant of the invention in which the meeting point is located at the service supply center.

FIG. 5 illustrates an alternative embodiment of the inventive communication method, in which the resource node 17 is oriented to the service supplier 16 and the meeting node 18 is oriented to the service order central 12. In this case, it has been assumed that the service order central 12 has the roll of supplier 18, whereas the service supplier has the roll of ordering the connection. In this case, a connection route is established from the service order central 18 to the service supplier 16, as indicated by the full arrow 8. The signal connection between the parties concerned is indicated by the broken arrow 5.

Figure 6:
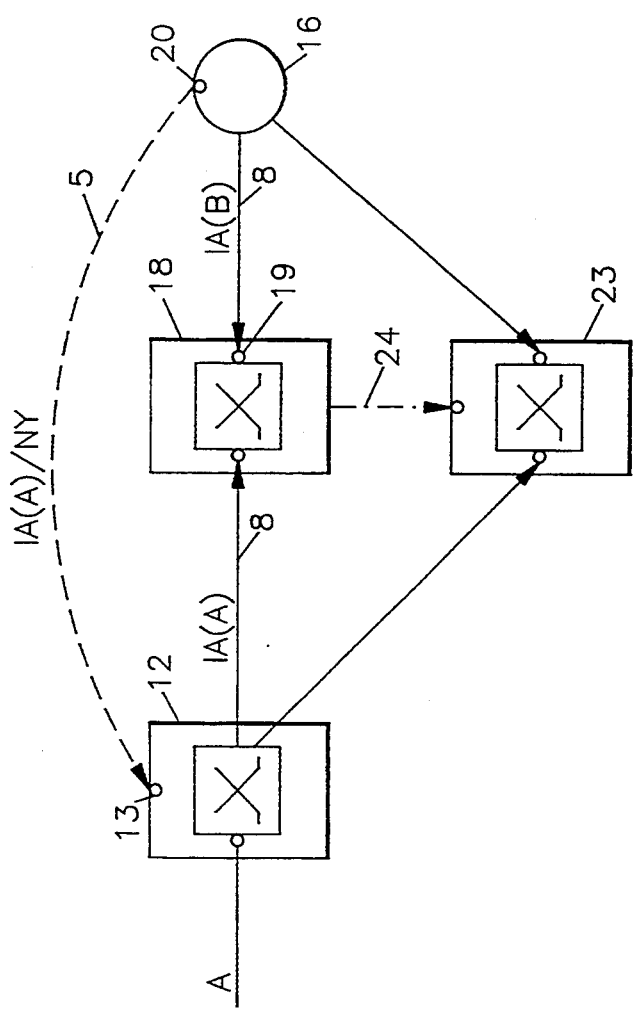
FIG. 6 illustrates a variant of the invention which enables a meeting point to be changed, wherein the Figure also illustrates different data records which illustrate schematically the inventive communication method.
Figure 6:
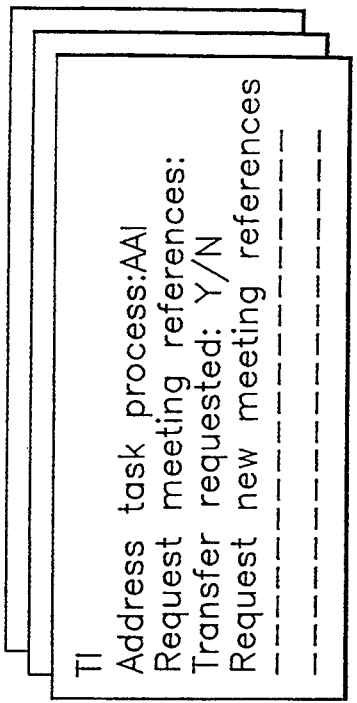
Figure 6:
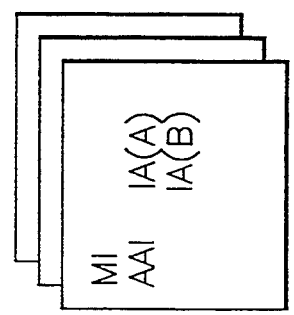
Figure 6:
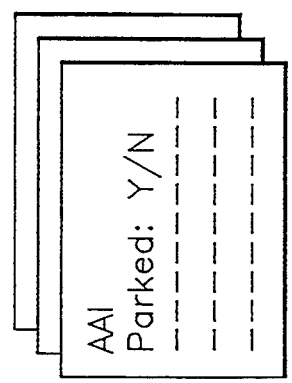

FIG. 6 illustrates a variant of the inventive communication method in which it is possible to move the meeting point from the original meeting node 18 to a new meeting node 23, this transfer being illustrated by the chain-line arrow 24. In the FIG. 6 example, the service supplier 16 has access to all equipment required for supplying the service requested. Thus, the supplier 16 is connected with the meeting node 18 and supplies the service through an established connection represented by the two full-line arrows 8. When the meeting point is to be transferred to the new meeting node 23, it is necessary for both parties 12 and 16 to clear the connections with the old meeting node 18. The service supplier 16 then turns to the new meeting node 23, over a signal network not shown, and requests two new meeting references which are transferred to the service supplier 16 by the new meeting node 23 on the signalling network. When the service supplier 16 is in receipt of the two new meeting references, designated IA(A)/NY and IA(B)NY respectively, the meeting reference IA-(A)/NY is sent to the service order central 12 via a signal connection, represented by the broken arrow 5. The service order central 12 calls the new meeting node 23 while reciting the new meeting reference IA(A)NY and the service supplier 16 also again calls the new meeting node 23 while reciting the new meeting reference IA(B)/NY. When the new meeting arranger 23 finds that both parties are present, the parties are connected together in the new meeting node 23. The parties have now met in the new meeting node 23 and the service supply can continue.

Shown at the bottom of FIG. 6 are different data records that are generated in the different nodes. Shown furthest to the left in the Figure is an example of a record which includes the meeting reference AAI generated by the assignment process 13 in response to the request for a service made by the user A. A new data record corresponding to the record AAI is created for each incoming service order. Such additional records are shown by the rectangles lying behind the data record AAI. Shown in the center of FIG. 6 is the data record that is generated by the assignment process 19 in the meeting node 18 when a connection order arrives from the service supplier 16. This data record is called meeting individual, MI, and refers to the meeting requested. The data record MI includes different fields which include information relating to ports and references over which programs the meeting node 18 must have at its disposal in order to be able to establish the connection between A and the service supplier 16. A corresponding data record MI is generated for each meeting order.

Shown furthest to the right in FIG. 6 is a data record which is generated by the assignment process 20 and which is initiated in the service supplier 16 when a service order is received. This data record, called service individual, TI, is comprised of several fields, among others a field in which the address, i.e., AAI, to the assignment process 13 is stated. Writing of information in the different fields is controlled by the main control processor in respective nodes. A corresponding data record TI referring to the order concerned is generated for each service order.

According to the present invention, the service customer A may ask for the service to be delivered to another access port than that from which the service order was made. FIG. 7 illustrates an example of a traffic situation in which a service customer A orders a service over the standard telephone network, for instance, a service supplier price list 16, and asks for the service to be delivered by telefax to a subscriber C whose address leads to a node 25 which is separate from the node 10 in which the service supplier has access to the telecommunication network T.

Similar to the procedure described above with reference to FIG. 1, the call made by the service supplier is transferred to the service order central 12, in which A places his order. A user access individual AAI is created and subsequent to coaction with the database 15, the service order central selects a service supplier 16 to which AAI is transferred on the signal route 3 to serve as a reference for the order placed by A. The destination address of the service requested, in this case the telefax number of C, is also sent on the same signal path. Since the service customer A is no longer relevant as a receiver of the delivery from the service supplier, the connection between A and the service order central 12 is cleared and the service supplier 16 chooses a meeting node 18 and a subsidiary supplier. The subsidiary supplier is found in the resource node 17. The service supplier then sends a connection order to the selected meeting node 18 over the signal path 6.

When the meeting node 18 receives the connection order, there is commenced an assignment process which, among other things, (a) reserves an interaction number, hereinafter called IA(B); (b) sends the reserve interaction number to the service supplier 16 via the signal path 7; (c) makes an outgoing call with the telefax number of C as the destination address, adopts a waiting state and awaits the receipt of an incoming call with the destination address IA(B); (d) connects internally in the meeting node 18 the outgoing connection to C with an incoming connection which uses the interaction number IA(B) as the destination address; and, (e) clears the internal coupling of said two connections when both of said connections have been broken.

When the meeting node makes the outgoing call to C and C answers the call, a connection 8(1) to C is established via a node 25 which provides C with access to the telecommunication network.

When the service supplier 16 receives the interaction number IA(B), the service supplier calls the subsidiary supplier 17 over the signal path 14 and requests the subsidiary supplier to supply the service, i.e. to fax over the price list and to use the interaction number IA(B) as the destination address and not C's fax number.

When the subsidiary supplier makes the aforesaid call while using IA(B) as the destination address, a connection 8(2) to the meeting node is established.

This is detected by the assignment process in the meeting node and the connections 8(1) and 8(2) are now established one with the other, in the meeting node in accordance with process (d) above. The parties 17 and C are now connected with one another and the subsidiary supplier 17 sends the price list to C. When the service has been completed, the two parties, the connections 8(1), 8(2) and the internal connection of 8(1) with 8(2) are cleared. The assignment process in the meeting node is cancelled.

It will be noted that the nodes 18 and 25 lying between the parties 17 and C have nothing to do with the configuration of the service concerned, but solely function as coupling nodes.

As an alternative method to that aforedescribed, it is possible for the assignment process in the meeting node 18 to utilize, instead of stage (c), the paging method according to U.S. Pat. No. 08/018,212 in combination with the aforementioned communication method according to U.S. Pat. No. 08/018,213.

It is thus clear that the service customer and the receiver are not located in one and the same area. It will also be evident from the aforedescribed examples that the service customer and the service supplier need not be located in one and the same area and that a service can be supplied from different areas.

FIG. 8 illustrates an example of how the inventive communication method can be applied in conjunction with mobile telephones of the kind which incorporate a paging facility and which are described in the U.S. patent application Ser. No. 07/686,600 filed on the 17th Apr. 1991 and entitled "A Communication System for Integrating a Paging System with Cellular Radio Telephones". The presence of a standard telephone network 30, a mobile telephone network 31, a paging network 32 and a number of mobile telephones 33 of the aforesaid kind is a prerequisite of the illustrated example. In this described example, the mobile telephones 33 need not register themselves as they move. This is novel in relation to traditional mobile telephony, in which the geographic location of each mobile telephone is repeatedly registered in a so-called home location register where the mobile telephone is active. This registration is also carried out even when no telephoning takes place while the mobile telephone is moving. In the case of the embodiment illustrated in FIG. 8, however, the mobile telephones 33 are shut down when they not used for telephony, meaning, among other things, that the telephones are unable to register themselves in a home location register. The advantage gained with this example is that signalling resources in the mobile telephone network are released and that the batteries of the mobile telephones 33 are conserved. The mobile telephones 33 can be awakened, either with the aid of the integrated paging apparatus, schematically shown at reference numeral 34, or when a subscriber wishes to make an outgoing call on the mobile telephone.

The telephone network 30 includes a number of switch nodes, symbolized by circles. The mobile telephone network 31 includes a number of nodes, among which are two mobile telephone stations designated MSCA and MSCB, a modified home location register designated HLR, and a meeting node 35.

In FIG. 8, the full line arrow 36 identifies a stationary subscriber A who attempts to contact another subscriber B by dialling subscriber B's mobile telephone number. The call passes through different coupling stations in the telephone network 30 and, on the basis of the mobile telephone number, it is interpreted that the call shall be terminated at a mobile telephone. The call is connected through the coupling nodes to the mobile telephone station MSCA, which is situated nearest subscriber A from a geographical aspect. The call is handled in the mobile telephone network 31 in the mobile telephone station MSCA. The call is parked in MSCA and there is commenced an assignment or task process with the object of initiating communication between A and B.

To this end, the assignment process in MSCA enquires of the home location register "HLR" where B is registered. This enquiry is indicated by the arrow 37.

It can be mentioned by-the-way that when the home location register functions in accordance with traditional standards, subscriber B would be registered in the HLR and the HLR would inform the MSCA in which the MSCB subscriber B was registered.

When the enquiry raised by the MSCA arrives at the HLR, an assignment process UP is initiated. It is recorded in "HLR" that B can be reached through a paging process using a given paging address. The answer given by "HLR" to the MSCA is thus that subscriber B shall be paged with a given paging number. In stage 3 of the process, shown by the arrow 38, the assignment process in the MSCA sends a request for paging of subscriber B to a paging central 39 in the paging network 32. Subscriber B's paging reference, i.e., the paging number, is sent together with the order or request, whereafter the paging central sends out a paging message, symbolized by the sawtoothed arrow 38. The paging method is received by the paging apparatus 34, which alerts the mobile telephone, as symbolized by the arrow 40. Since B's mobile telephone is alerted by an incoming call, B shall register himself in the mobile telephone network and, in accordance with the invention, makes an outgoing call. This outgoing call is shown by arrow 41. According to the invention, subscriber B now rings his own mobile telephone number.

The call is received by the mobile telephone station that serves subscriber B at the location in which B is located at that moment. This mobile telephone station is referenced MSCB. When the call from B arrives, subscriber B is parked in the MSCB and a new assignment process UP is started, which checks what shall be done with the incoming call. The assignment process in the MSCB now enquires of the home location register "HLR" the whereabouts of the calling subscriber, subscriber B, this enquiry being indicated by the arrow 42. In the investigation corresponding to the enquiry, the assignment process will find the data record belonging to subscriber B and disclosing B's situation. This data record will show that B is engaged and that A should therefore be parked and await for B's call. The answer from "HLR" is shown by the arrow 43. Thus, the assignment process UP concerning B and designated UP(B) in the MSCB receives from "HLR" the command that B shall await for a meeting to be arranged. A new assignment process is started in "HLR". This new assignment process, designated UP(HLR), has access to the reference to the assignment process UP(A) in the MSCA together with a reference UP(B) to the assignment process in the MSCB. The assignment process UP(HLR) now has practically all information for creating a connection between A and B. In this stage, the assignment process chooses in "HLR" a meeting node, i.e. chooses where the meeting shall take place on the basis of the information given by the HLR as to where A and B are located. At the same time as the meeting node is selected, "HLR" sends a request concerning two meeting references. This request is marked with the arrow 44 and is sent to the meeting node, in the illustrated case the meeting node 35. In answer to this request, the meeting node sends two interaction numbers IA(A) and IA(B) to the assignment process UP(HLR) in "HLR". "HLR" sends the meeting references obtained to MSCA and MSCB respectively so that IA(A) and the reference UP(A) to the assignment process in MSCA is sent to MSCA, whereas IA(B) plus the reference UP(B) to the assignment process in MSCB is sent to MSCB. MSCA now connects the parked call from subscriber A with an outgoing connection having destination IA(A). In a similar manner, MSCB connect the parked connection from B to an outgoing connection having the destination address IA(B). The call from respective mobile telephone stations is shown by the two full-line arrows 45. These calls pass through the coupling stations in the telephone network 30, which solely establish the requested connections without having any knowledge whatsoever of the purpose for which the connections are intended. When both parties have been connected up to the meeting node 35, the meeting node discovers that a call having both meeting references has been received. The meeting node now connects these two incoming connections together, which is symbolized by the line 46. The parties A and B can now converse with one another.

When the call is ended, the established connections are cleared and the assignment processes are annulled.

As an alternative to the connections 45 passing through the telephone network 30, the mobile telephone network 31 may include dedicated lines between the meeting node 35 and MSCA and between the meeting node and MSCB respectively.

Another alternative to the example illustrated in FIG. 8 is one in which paging of subscriber B does not take place over the paging network 32 but instead over the mobile telephone network, in which case the mobile telephone 33 must be of a kind which is activated in order to be able to receive an alert signal.

Thus, in the example illustrated in FIG. 8 and the aforesaid alternative to this example, it is not subscriber A who calls subscriber B, but that both parties A and B call a common meeting point. The connections through the different networks are established in the same way as in a traditional network. All nodes present in the mobile telephone network can be used and they need only be provided with new software for the assignment processes and with process control software.

FIG. 9 illustrates examples of the various data records that are generated by the different assignment processes in MSCA, MSCB, HLR and in the meeting node 35. The assignment process which is started in MSCA when A calls generates a data record 47 referenced UP(A). This reference is used by "HLR" and the meeting node 35 when communicating with the MSCA. The record contains several fields, among them a field for the port on which the call from A arrives in the MSCA. Another field indicates that the call from A has been parked. A third field indicates that a control program shall enquire of "HLR" how the person addressed by A shall be sought. A fourth field states the reply given to the MSCA by "HLR", namely that B shall be paged. The assignment process gives to the meeting node an address which refers precisely to this data record UP(A). Still another field discloses that the assignment process has been placed in waiting for the receipt of a meeting reference, i.e. an IA-number. A last field states that ringing shall take place to the reference received.

A corresponding data record 48 having the reference UP(B) is initiated by the assignment process in MSCB when subscriber B makes a call. The answer received by the assignment process to the enquiry in HLR is that a call is waiting.

The assignment process taking place in "HLR" generates in response to a call from subscriber A a data record 49 having the reference UP(HLR). This data record has a field which provides information concerning B, as to whether B is active or inactive, while another field states the paging number of subscriber B, a third field states that subscriber B is engaged or free, a fourth field contains information concerning the address of the reference UP(A), a fifth record contains information concerning the address of the record UP(B), and remaining fields are controlled by controlling processes and disclose whether or not subscriber B is parked, among other things.

FIG. 9 illustrates a data record 50 having the reference MI(AB) and referring to a meeting individual relating to the meeting between A and B. This record is generated by an assignment process which starts in the meeting node 35 upon the arrival of a meeting order or request. The data record MI(AB) includes a first field in which there is given the address of the data record UP(A), a second field which includes the reference to the data record UP(B), a third field with the meeting reference IA(A) of the first data record UP(A), and finally a fourth field with the meeting reference IA(B) to the second data record UP(B). These two latter meeting references IA(A) and IA(B) select the meeting node 35 from their own number series.

Figure 10:
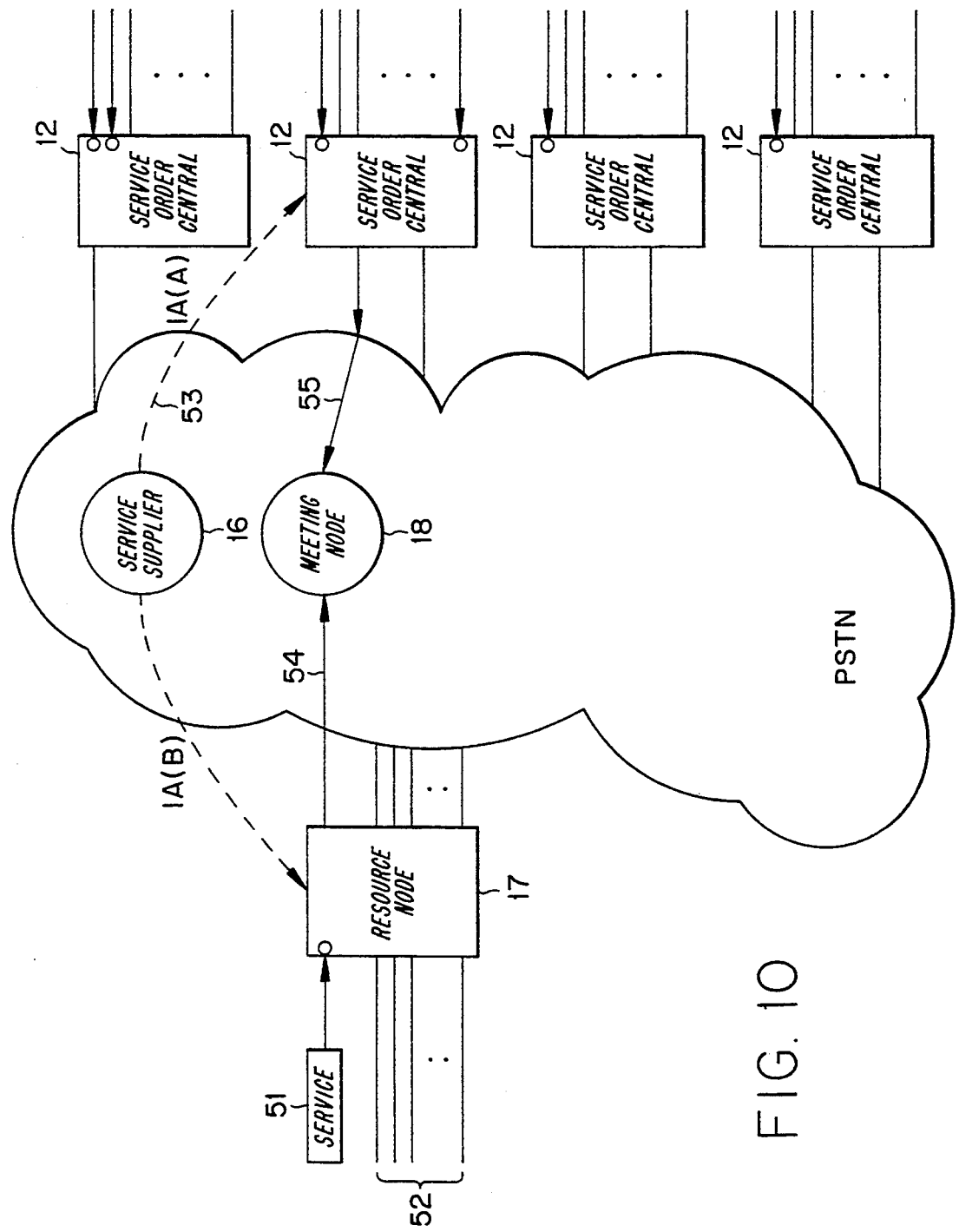
FIG. 10 illustrates a standard telephone network in which mass calls are made to one and the same service supplier.

FIG. 10 illustrates a situation in which the standard telephone network PSTN (Public Switched Telephone Network), where several thousand subscribers, schematically illustrated by the horizontal arrows on the far right of FIG. 10, simultaneously call a resource node 17 which contains a service 51 with which all of the calling subscribers will come into contact. This service may, for instance, involve coming into contact with the program leader of a television show. The resource node 17 also includes a number of local users, collectively referenced 52. When the principles of the invention are not applied, the local users 52 would meet with congested lines when thousands of subscribers ring the same number in the resource node 17 at the same time, and the entire telephone network PSTN would be unevenly loaded as a result of the highly dense traffic on the telephone stations (not shown) located close to the resource node. When the inventive principles are applied, the calling subscribers will first arrive at their respective service order centrals 12 and there parked. Each service order central 12 will attempt to contact a service supplier 16, via a signalling network, illustrated schematically by the broken arrow 53. The service supplier will not initiate choice of meeting point and allot IA-numbers to a meeting until contact with the service supplier has been achieved and necessary resources have been reserved. The establishment of connections through the network will then only take place at the rate at which the service supplier can supply a service. Remaining service customers are parked close to their respective service order centrals. The telephone stations in the telephone network PSTN are not unevenly loaded, or biased, and the local subscribers 52 in the resource node are not inflicted by mass congestion of the service 51. When the service is overloaded, many users will wait at respective service order centrals. Even though these subscribers hang-up, the service orders placed by the subscribers will not have caused the establishment of unnecessary connections in the network.

I claim:

1. A method for utilizing at least one telecommunication network for achieving communication between four participants, namely: a service customer who orders a service which is addressed with a destination address; a service order central which is able to identify that the destination address of an incoming call relates to a service; a service supplier which administers and supplies services and which is selected by the service order central; and a service receiver for receiving an ordered service; said method comprising the following steps:

the service customer orders a service; and
directing the service order to an appropriate service order central in which the order arrives on an incoming connection,
wherein
the service order central:
parks the incoming call;
starts an assignment process which creates a service order individual which allots the service order an order identity which relates the service order to the service customer;
sends a unidirectional alert which includes the order identity and which is transmitted further via nodes, of which one node finally establishes the service supplier from which the service ordered shall be delivered;
the service supplier creates a signal connection to the service order individual in order to settle, with the service order individual, the conditions for establishing a connection via which the ordered service shall be delivered, said service supplier using the order identity as a reference when said signal connection cooperation is established,
the service supplier books resources required for supplying the ordered service;
the service supplier and the service customer decide their tasks of originating and of terminating said connection used for the delivery of the ordered service, and
the service supplier supplies the ordered service to the service receiver.

2. A method according to claim 1, wherein the service supplier transfers responsibility for delivery of a service to a subsidiary supplier.

3. A method according to claim 2, wherein the supplier of the service himself decides the manner in which the service shall be supplied.

4. A method according to claim 3, wherein the service order central and the service supplier are allotted a respective addressing information which is used by respective parties for requesting the establishment of a respective communication connection with a common node in which the communication connection from the service supplier to the common node and the communication connection from the service order central to said node are coupled together.

5. A method according to claim 4, wherein the service supplier selects the common node.

6. A method according to claim 5, wherein the service supplier transfers his addressing information to the subsidiary supplier in conjunction with said transfer; and in that the subsidiary supplier initiates the establishment of the communication connection to said common node.

7. A method according to claim 6, wherein said transfer is effected by signalling of the service supplier to the subsidiary supplier over a selected signal network chosen from among those telecommunication networks which both the service supplier and the subsidiary supplier have at their common disposal.

8. A method according to claim 1, wherein the service order central negotiates with the service customer over the incoming connection as to over which telecommunication network the desired service shall be delivered, this telecommunication network being chosen from among those at which the service customer and the service supplier have at their common disposal.

9. A method according to claim 1, wherein communication shall be effected between a service supplier on the one hand in the form of mobile telephones and user and on the other hand service order centrals in the form of mobile telephone stations, wherein a service supply mediator includes a home location register which includes data records that are associated with individual vehicle telephones, comprising the following steps:

the service customer makes a call using a mobile telephone station number as an address to the called mobile telephone station; routing the call to a mobile telephone station; signalling the home location register by the mobile telephone station to inform the register of the incoming call and to ask the home location register for information concerning the temporary address of the addressed mobile telephone;
establishing a connection route between the user and the mobile telephone on the basis of the temporary address; and connecting said mobile telephone station to said call, wherein the call is parked in the mobile telephone station and allotted an order identity;

the home location register records the order identity and information that a call is waiting in the data record which is associated with the addressed mobile telephone in answer to the inquiry made by the mobile telephone station;

in response to the alert, the mobile telephone station makes a call giving its mobile telephone number as the address; the call from the mobile telephone station is routed to a guest mobile telephone station, which serves the area within which the mobile telephone station is located;

the guest mobile telephone station signals the home location register to inform the register about the incoming call and to request from the home location register information concerning the temporary address of the addressed mobile telephone; and the home location register in response to said requests initiates the establishment of a connection route between the incoming call from the mobile telephone and the parked call in the mobile telephone station with the use of the order identity.

10. A method according to claim 9, wherein establishment of the connection route is created by the following steps:

(a) using two address references which addresses a common node in the mobile telephone network;

(b) signalling the first meeting reference to the mobile telephone station while instructing the mobile telephone station to request the establishment of a first outgoing connection which shall have the first meeting reference as its destination, and to couple the first outgoing connection with the connection on which the call from the service customer arrived;

(c) signalling the second meeting reference and the order identity to the guest mobile telephone station with an instruction that the guest mobile telephone station shall first request the establishment of a second outgoing connection with the second meeting reference as its destination and to couple the second outgoing connection with the connection on which the call from the mobile telephone arrived; and (d) coupling the first and the second connections together in said common node.

11. A method according to claim 10, wherein the home location register signals the meeting references to respective mobile telephone stations.

12. A method according to claim 11, wherein the common meeting node signals the meeting references to respective mobile telephone stations.

13. A method according to claim 12, wherein the mobile telephone is alerted via a paging network and a pager coacting with the mobile telephone.

14. A method according to claim 9, wherein a mobile telephone registers itself in a mobile telephone station only when the mobile telephone shall be used.

15. A method according to claim 14, wherein said mobile telephone registers itself in the mobile telephone station in response to an incoming alert and when the owner of the telephone wishes to make an outgoing call.

* * * * *